UNITED STATES PATENT OFFICE.

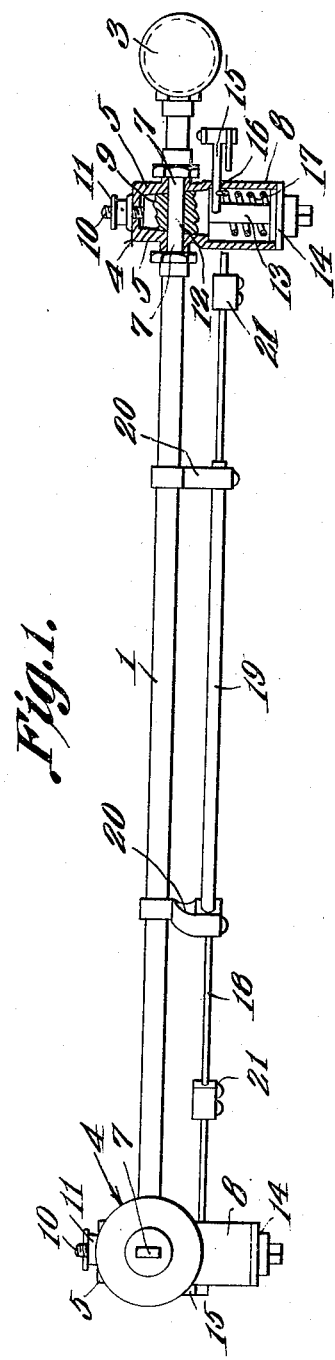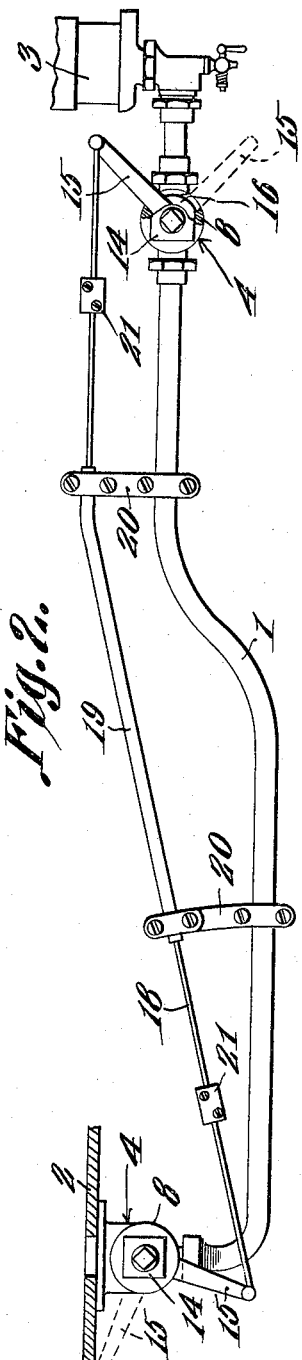

ALBERT CHARLES MENGES, OF MEMPHIS, TENNESSEE.

AUTOMATIC GASOLENE SHUT-OFF.

1,128,345.  Specification of Letters Patent.  Patented Feb. 16, 1915.

Application filed January 29, 1914. Serial No. 815,261.

*To all whom it may concern:*

Be it known that I, ALBERT CHARLES MENGES, a citizen of the United States, residing at Memphis, in the county of Shelby and State of Tennessee, have invented a new and useful Automatic Gasolene Shut-Off, of which the following is a specification.

The present invention appertains to an automatic gasolene shut off for the gasolene supply pipe of an internal combustion engine, and aims to provide a novel and improved device of that character which shall be of such construction and operation, that a fire or conflagration adjoining the gasolene supply pipe, will result in the shutting off of the gasolene flow.

It is also within the scope of the present invention to provide a device of the nature indicated embodying a unique assemblage of parts, in order that the structure shall be comparatively simple, compact, and inexpensive, and in order that the device will be automatic in operation, as well as efficient.

With the foregoing general objects outlined, and with the other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein—

Figure 1 is a plan view of the improved device as applied to the fuel supply pipe, parts being broken away and parts being shown in section. Fig. 2 is a side elevation of the parts delineated in Fig. 1, portions being broken away.

In the drawing, the numeral 1 designates a gasolene or fuel supply pipe leading from the bottom of a fuel tank 2 to the carbureter 3, the said parts being taken as typical. In carrying out the present invention, a pair of valves or stop cocks 4 are interposed in the fuel supply pipe or gasolene line 1, one of the valves 4 being interposed in the pipe 1 adjoining the carbureter 3, the other valve 4 being interposed in the pipe 1 adjacent the fuel tank 2, although other arrangements may be made, as will be apparent to the mechanic. The valves or stop cocks 4 are practical duplicates of each other, and a description of one will suffice for both.

Each of the valves 4 embodies a casing or body 5 having a tapered bore and the ports 7 leading from the bore to the coupling members, as will be apparent. The casing or body 5 is also provided with a cylindrical extension 8 projecting from one end thereof.

Disposed within the bore of the casing 5, is a tapered spigot 9 having a reduced extension 10 passing through the other end of the casing 5 and bearing retaining or securing means 11 to maintain the spigot in position. The spigot 9 is provided with a lateral port or duct 12 adapted to be brought into registration or alinement with the ports 7, under normal conditions, to permit of the flow of the gasolene or fuel through the valve. The spigot 9 is further provided with a stem 13 projecting axially within the cylindrical extension 8 of the casing 5, and having its free end journaled through the cap or plug 14 engaged within the mouth or open end of the extension 8.

A lever 15 is attached to the butt end of the stem 13, and works through an arcuate slot 16 provided in the basal portion of the extension 8, a coiled wire spring 17 being housed within the extension 8, around the spigot stem 13 having its respective ends attached to the lever 15 and the cap 14. The spring 17 has a tension serving to move the spigot 9 to its valve closing position when the lever 15 is free to swing.

The two valves 4 are so arranged, that when the spigots thereof are swung to position to open the valve, the free ends of the levers 15 will be moved toward each other, the free ends of the levers 15 being connected by a fuse cord or wire 18 which is of sufficient length to hold the levers 15 at such positions as to maintain the valves open. The fuse cord or wire 18 is guided through a flexible tube 19 which is terminally supported from the fuel pipe 1 by means of brackets 20, the terminals of the brackets 20 having clamps to embrace the pipe 1 and the tubular guide 19. Suitable stops 21 are also preferably secured upon the fuse cord 18 beyond the ends of the tubular guide 19, to prevent the cord 18 from being withdrawn from the guide 19 if the said cord is fused at one end.

With the valves 4 held in open position by the fuse cord 18, the gasolene will be free to flow from the fuel tank to the carbureter, or to the internal combustion engine. Perchance, should a fire or conflagration occur adjoining the carbureter or combustion engine, or adjoining the fuel tank, the fuse cord 18 would become fused, so as to permit the levers 15 to be swung under the tension of the springs 17, so as to close the spigots 9, the movement of the levers 15 being limited by the respective ends of the slots 16 in order that the spigots will be held at closed position. Consequently, the flow of gasolene will be shut off, which will reduce to a minimum, the liability of the gasolene to become ignited. It will be evident that the duplicate valves will shut off the flow of gasolene both at the fuel tank, and adjoining the carbureter, although, if desired, a single valve may be employed, and the fuse cord may be attached to any suitable object, so as to maintain the valve in open position under operating conditions. When the two valves are employed, it will be evident that the springs 17 work in opposition, and neutralize or equalize each other thereby creating a tensile strain upon the fuse cord to carry out the results desired. The present appliance may be employed for various purposes, such as in connection with either stationary engines, or automobile engines, and the like. The other advantages and capabilities of the present invention will be apparent from the foregoing taken in connection with the drawing, it being observed that the objects aimed at have been carried out satisfactorily.

Having thus described the invention, what is claimed as new is:—

1. In combination with a fuel supply pipe, a pair of valves interposed therein and each having a lever and means for swinging the same to close the valve, and a fuse cord connecting the said levers to hold the said means in opposition and to normally hold the valves open.

2. In combination with a fuel supply pipe, a pair of valves interposed therein, each of the valves embodying means tending to close the same, and a fuse cord connecting the valves to hold the said means in opposition and to normally hold the valves open.

3. In combination with a fuel supply pipe, a pair of valves interposed therein, and each embodying a spigot having a lever, a spring carried by each valve tending to move the spigot to valve closing position, and a fuse cord connecting the said levers to hold the springs in opposition and to normally hold the spigots in valve opening position.

In testimony that I claim the foregoing as my own, I have hereto affixed my signature in the presence of two witnesses.

ALBERT CHARLES MENGES.

Witnesses:
R. L. CARR,
W. R. SIMS.

Copies of this patent may be obtained for five cents each, by addressing the "Commissioner of Patents, Washington, D. C."